March 27, 1951
J. E. GRAY
2,546,594
APPARATUS FOR REMOVING MOISTURE
IN A REFRIGERATING SYSTEM
Filed April 15, 1948
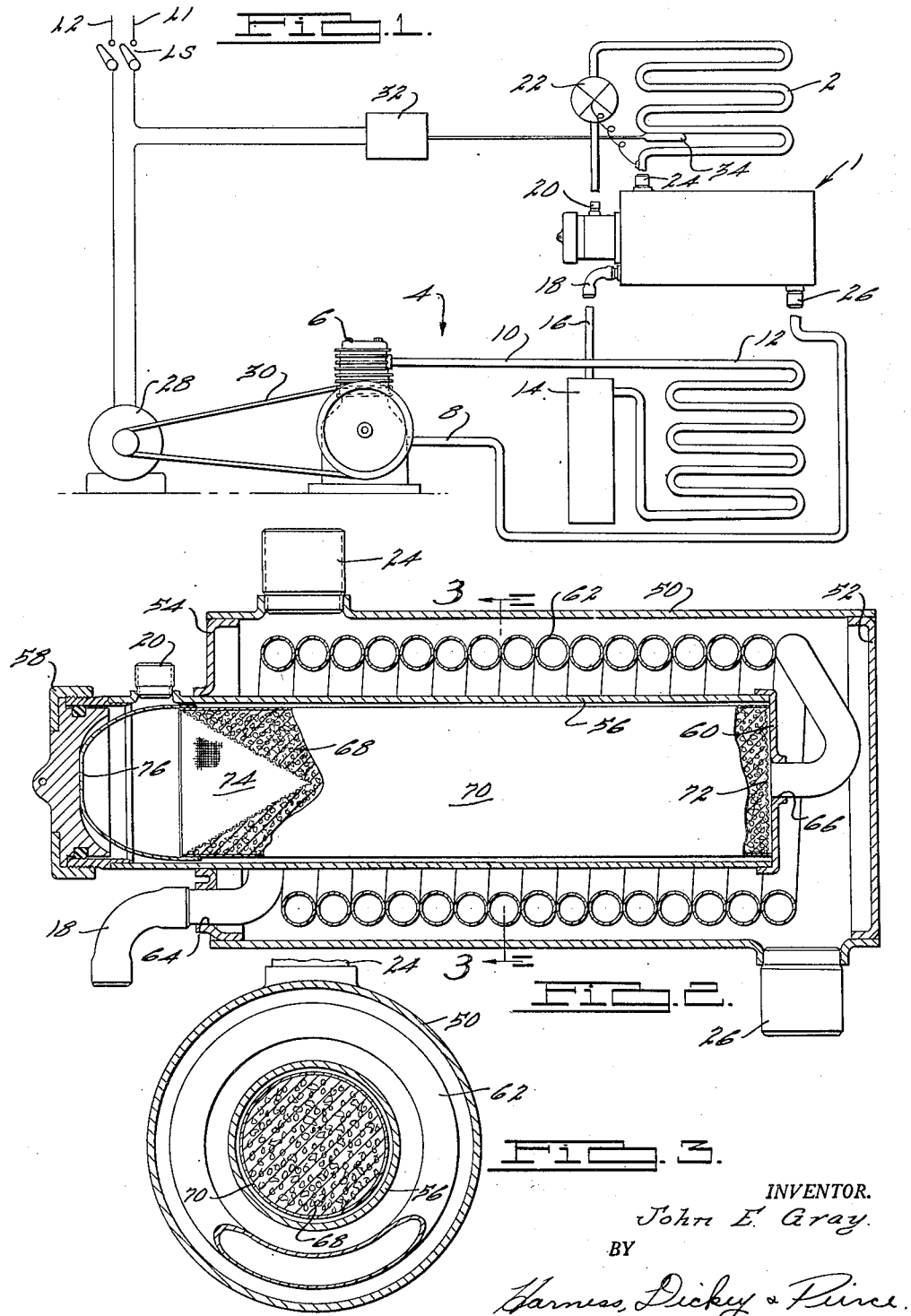
INVENTOR.
John E. Gray.
BY
Harness, Dickey & Pierce.
ATTORNEYS.

Patented Mar. 27, 1951

2,546,594

UNITED STATES PATENT OFFICE 2,546,594

APPARATUS FOR REMOVING MOISTURE IN A REFRIGERATING SYSTEM

John E. Gray, Port Huron, Mich., assignor to Mueller Brass Co., Port Huron, Mich., a corporation of Michigan Application April 15, 1948, Serial No. 21,133

4 Claims. (Cl. 62—115)

This invention relates generally to refrigeration apparatus and more specifically toward the apparatus for removing moisture from the refrigerant of the system.

An object of this invention is to provide a more efficient moisture removing apparatus.

A further object is to provide such an apparatus which is economical of manufacture, easily assembled into the refrigerating system, and which will be trouble free in operation.

A further object of the invention is to provide such an apparatus in combination with a heat exchanger whereby two usual accessories may be combined into one easily manufactured unit which may be easily and simply assembled into the refrigerating system.

A further object of the invention is to provide a new and novel arrangement for using a drier in a refrigerating system.

Other objects of the invention will be apparent from the specification, appended claims and drawing and in which drawing the several like parts are referred to in the several views by the same reference character, Figure 1 is a schematic view of a refrigerating system embodying the invention;

Fig. 2 is a view in central vertical section of the combined drier and heat exchanger; and Fig. 3 is a view taken substantially along the line 3—3 of Fig. 2.

Heat exchangers and driers have been used with refrigeration systems for many years as two separate elements; the heat exchanger usually being positioned immediately adjacent the outlet of the evaporator and the drier being located in the liquid line at a convenient location adjacent the liquid receiving tank or liquid outlet of the condensing unit.

Driers consist essentially of a chamber filled with a dessicating material and equipped with the necessary retainers and filters. Its purpose is to remove any moisture from the refrigerant that is present in amounts in excess of that which the refrigerant can hold in solution. The heat exchanger on the other hand is provided for the general purpose of cooling the liquid being supplied to the evaporator by transferring heat to the suction gases whereby the flash gas of the liquid being supplied to the evaporator is reduced.

There are a number of dessicating materials on the market but the most popular and the one which is generally used is silica gel. When silica gel is introduced into a refrigerating system, it seeks an equilibrium condition with respect to moisture. Water is removed from the refrigerant by selective adsorption; that is, the microscopic cells of the silica gel have a greater affinity for water than they do for refrigerant and oil. Water will therefore be attracted into the cells replacing the refrigerant. With a given proportion of water and a given quantity of dessicant, the equilibrium point reached varies as the temperature varies. As the temperature is decreased, silica gel has a greater capacity to remove water and retain it, therefore if the temperature decreases the amount of water remaining in the refrigerant decreases.

The solubility of water in refrigerants also decreases as the temperature decreases. With the modern trend toward lower temperatures in refrigeration work, there is an increased need for more efficient drying means. In the prior art system, this change in drying capacity of the drier has not been taken into account and it was deemed merely necessary to place a drier with a suitable dessicating material such as silica gel, into the liquid line, causing the refrigerant liquid to flow therethrough without any consideration being taken of the temperature of the liquid being passed through the drier. In the installation of a new refrigerating system therefore as might be expected from the above, certain troubles from moisture have been encountered during the initial few days or weeks of operation of the system requiring a return visit of a serviceman or of the installer of the equipment. The serviceman would then go over the system, replace or repair or correct the parts in which the moisture was present, which in the case of a Freon 12 system is generally at the liquid feeding device into the evaporator, and then to replace the drier originally installed in the system with a new drier. Sometimes a second repeat visit with a second or third change of driers was necessary before the driers had adsorbed sufficient moisture from the system so that the system would operate satisfactorily. This is especially true in apparatus which operate at very low temperatures, such as frozen food storage apparatus.

According to this invention, the drier is placed in the coldest practical portion of the liquid line whereby the desiccant will be held in its greatest adsorbing condition. This permits the desiccant to perform a more thorough drying job where the moisture content of the liquid refrigerant is reduced to such a degree that no free or residual moisture remains in the liquid or will be precipitated therefrom when the temperature thereof lowers to that of the evaporator.

Referring to the drawing, the numeral 1 designates generally the combined heat exchanger drier unit which is located intermediate a refrigerant evaporator 2 and a condensing unit generally designated 4. The condensing unit comprises a vapor compressor 6 having vaporized refrigerant gases supplied thereto through a suction conduit 8 and discharging the compressed vapor through a discharge conduit 10 into a condensing coil 12. The coil 12 may be cooled by natural circulation of cooling medium such as the air in which the condenser is located or may be cooled by forced convection of the air by means of a cooling fan (not shown) or by any other usual method.

The high pressure refrigerant condenses in the condenser 12 and flows into the receiver 14. The liquid outlet 16 of the receiver 14 is connected to the inlet 18 of the apparatus 1. The liquid refrigerant flows from the liquid outlet 20 of the apparatus 1 through a suitable liquid controlling valve such as a thermostatic expansion valve 22 in controlled amount into the evaporator 2. The outlet of the evaporator 2 is connected to the suction inlet port connection 24 of the device 1. The suction outlet connection 26 thereof is connected to the suction line 8 for flow of vaporized refrigerant to the compressor 6.

The compressor 6 is shown as being driven from an electric motor 28 by means of a belt 30. The motor 28 is energized from a convenient source of electrical energy through the lines L1, L2 upon closure of a disconnect switch LS and a thermostat 32. The thermostat is shown as being controlled by means of a bulb 34 in heat exchange relation with the evaporator 2 and acts in accordance with changes in temperature of the evaporator to control the energization of the motor 28 from the lines L1, L2 in the usual manner. It is to be distinctly understood that the thermostat 32 might be controlled with the bulb in any other suitable location conventional in the art or the system might be controlled by means of a conventional suction pressure control. The particular liquid refrigerant feeding means and means for controlling the refrigerant compressor or even in maintaining continued operation of the compressor forms no specific part of this invention and has been shown merely to illustrate one type of refrigerating system in which the device 1 may be embodied.

Referring more specifically to the combined drier and heat exchanger device 1, the device comprises a cylindrical shell 50 having one end closed by a circular plate 52 in a suitable manner and having its other end closed by an annular plate 54. A second cylindrical shell 56 extends through the central opening of the annular plate 54, longitudinally of the shell 50, and terminates a short distance inwardly from the end plate 52. The outer end of the second shell 56 is sealed by means of a removable cap 58. The inward end of the shell 56 is closed by means of an annular disk 60. A heat exchanging coil 62, helically wound, is located in the space between the shells 50 and 56. One end of the coil 62 extends outwardly through and is sealed within an aperture 64 in the annular member 54, its other end extends into and is sealed within the central aperture 66 of the disk 60. The cylindrical shell 50 is provided with a pair of apertures at opposite ends in which are sealed the inlet connection 24 and the outlet connection 26. The liquid inlet connection 18 is connected to the end of the heat exchanger tube 62 which extends outwardly through the aperture 64 while the outlet connection 20 is sealed within an aperture extending through a wall of the inner shell 56 in the portion thereof externally of the annular member 54.

Suitable desiccating material 68 is contained within an open-ended cylindrical metallic sleeve 70 positioned within the shell 52. The desiccating material 68 which may be and preferably is silica gel is held within the sleeve 70 between fine mesh screens 72 and 74. The screen 72 is located just inwardly of the inner open end of the tubular member 70 while the conical-shaped fine mesh screen 74 is located adjacent the other end of member 70. A suitable resilient, handle-like, member 76 formed of strip stock is secured to the end of the cylindrical member 70 adjacent the screen 74 and resiliently engages the inner surface of the cap 58 whereby the cylindrical member 70 is held in a substantially fluid tight manner to the annular member 60. In this manner liquid refrigerant flows through the inlet 18, through the heat exchanger coil 62 into the interior of the cylinder member 70 through the screen 72, passes through the full length of the silica gel, outwardly through the screen member 74, and then outwardly to the liquid controlling means through the outlet 20.

The operation of the device is as follows:

Liquid refrigerant from the receiver 14 flows through the liquid line 16 and the inlet connection 18 into the heat exchanger tube 62 through the silica gel 68, the outlet 20, the liquid controlling expansion valve 22 into the evaporator 2 wherein it is evaporated from a liquid into a vapor state at low temperature and pressure and flows outwardly from the evaporator 2 through the inlet 24 into the space between the shells 50 and 56 and through the outlet 26 and suction conduit 8 to the compressor 6 wherein it is raised in pressure and discharged through the conduit 10 into the condenser 12 wherein it is condensed back to liquid form and flows into the receiver 14 for recirculation through the system.

The suction gases leaving the evaporator are quite cold and as they pass in heat exchange relation with the heat exchanger coil 62, whereby some of the sensible heat of the liquid within the coil 62 is transferred to the suction gases thereby cooling the liquid contained in or flowing through the coil 62 and heating the gases whereby the liquid entering the silica gel is at a lowered temperature. The cold refrigerant gases flowing between the shells 50 and 56 also tend to cool the shell 56 and the contained silica gel 68. The silica gel therefore is maintained at a low temperature and in its greatest adsorbing condition whereby sufficient moisture may be removed from the liquid refrigerant so that no free moisture will be precipitated when the refrigerant temperature is reduced to the low level in the evaporator.

Also by the use of a combined drier heat exchanger, an apparatus is provided which is extremely efficient in operation due to the fact that the temperature of the silica gel 68 and of the liquid refrigerant flowing therethrough are low whereby maximum water is removed from the system. Furthermore, the combined apparatus is more economical to manufacture and easier of installation than the prior art two separate apparatuses which due to temperature conditions of the drier will not act to remove the quantities of water which may be removed with applicant's device 1.

What is claimed and is desired to be secured by United States Letters Patent is as follows:

1. A combined drier and heat exchanger for a refrigerating system having liquid and a vapor conveying conduit comprising, a casing having a chamber for fluid with an inlet thereto and an outlet therefrom adapted to be interposed in the path of flow of the vapor in said vapor conduit, a container located within said chamber and in heat exchange relation with the fluid in said chamber and having an inlet and an outlet, a quantity of liquid collecting material in said container, said container being adapted to be interposed in the path of flow of the liquid in said liquid conduit.

2. A combined drier and heat exchanger for a refrigerating system, a hollow casing having an inlet and an outlet for flow of refrigerant into and out of the interior of said casing, a sinuous conduit located within said interior and having an inlet opening outwardly of said casing and having an outlet, a second casing having at least a portion thereof positioned within said first casing interior, said conduit outlet opening into the interior of said second casing, an outlet for said second casing opening exteriorly of said casings, and a dessicating material in said second casing interior through which fluid must flow from said conduit outlet to said second casing outlet.

3. The combination of claim 2 in which a container is provided for said material, said container having impervious side walls and pervious end walls, one of said container end walls engaging an end wall of said second casing, said conduit outlet opening through said second casing end wall in communication with said container one end wall.

4. The combination of claim 3 in which the other of said second casing end walls is removable and resilient means is provided to hold said container one end wall tightly against said second casing first-named wall.

JOHN E. GRAY.

REFERENCES CITED

The following references are of record in the file of this patent:

UNITED STATES PATENTS

| Number | Name | Date |
| --- | --- | --- |
| 2,279,928 | Shoemaker | Apr. 14, 1942 |
| 2,448,315 | Kunzog | Aug. 31, 1948 |